March 30, 1954  H. E. STROM  2,673,415
PURSE SEINE AND ITS METHOD OF USE
Filed April 24, 1950  5 Sheets-Sheet 1

Inventor
HILDING E. STROM
By Cook & Robinson
Attorney

March 30, 1954 H. E. STROM 2,673,415
PURSE SEINE AND ITS METHOD OF USE
Filed April 24, 1950 5 Sheets-Sheet 2
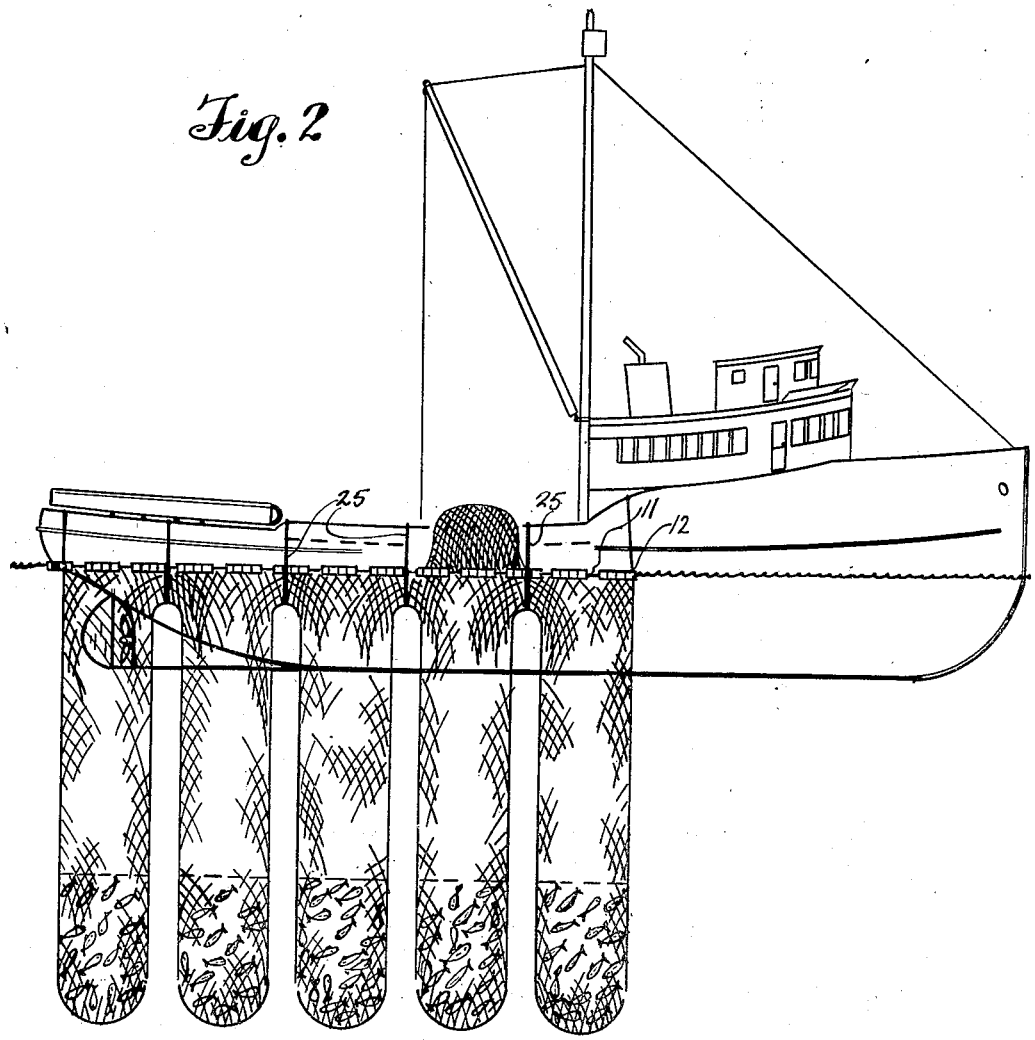
Inventor
HILDING E. STROM
By
Cook & Robinson
Attorney

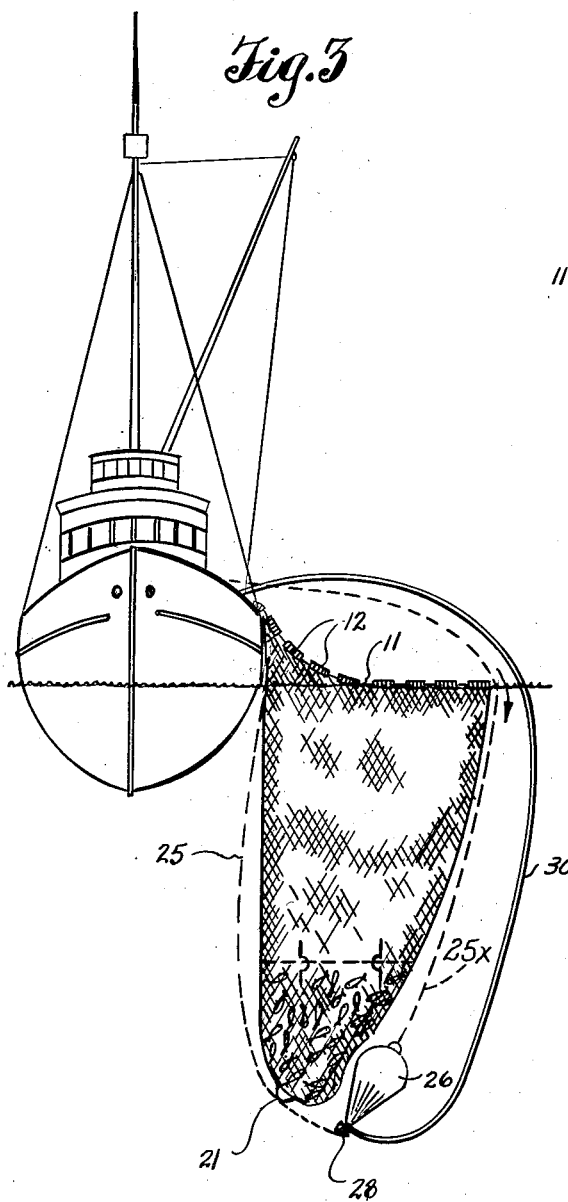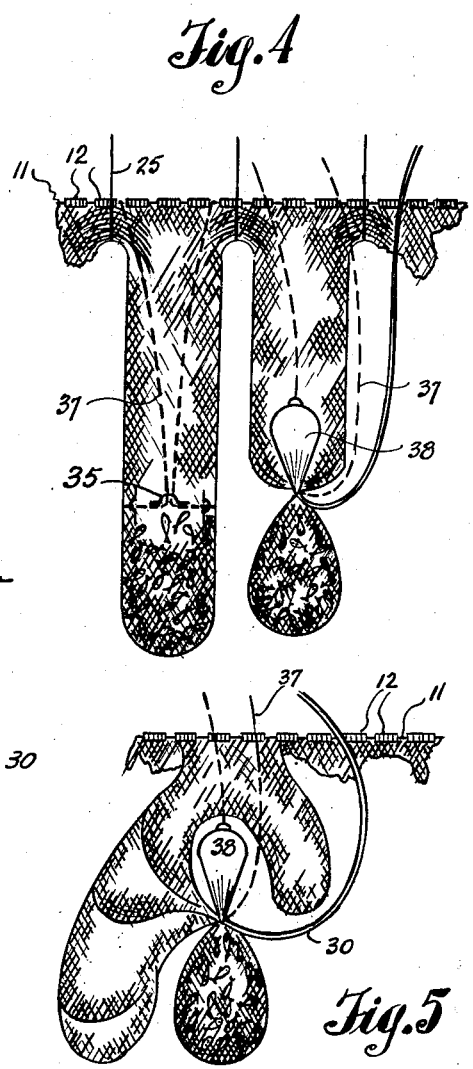

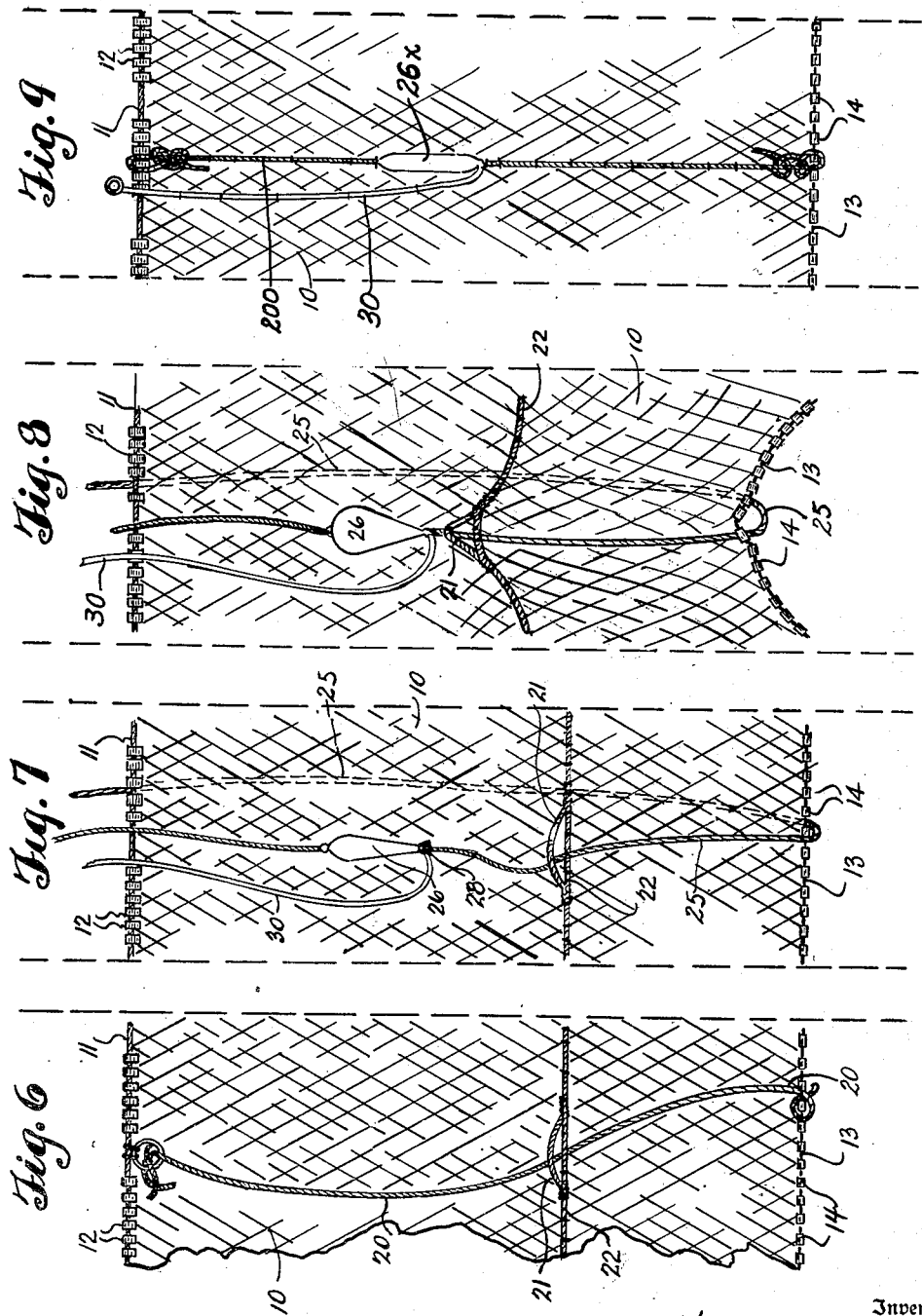

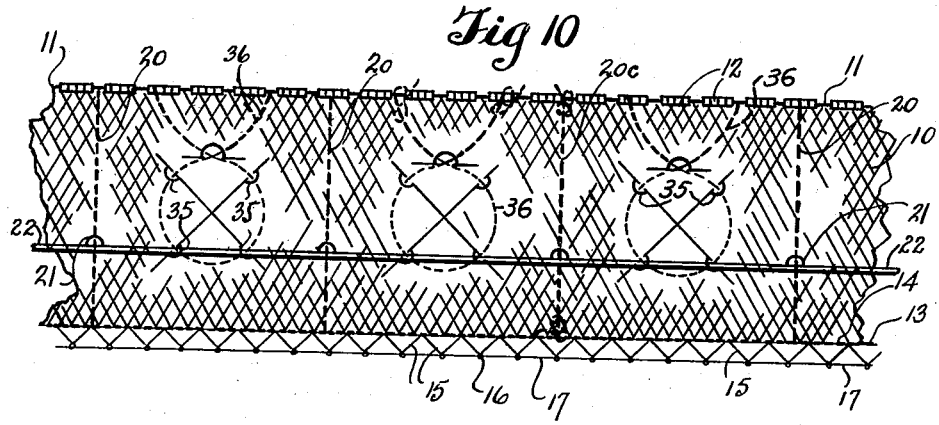
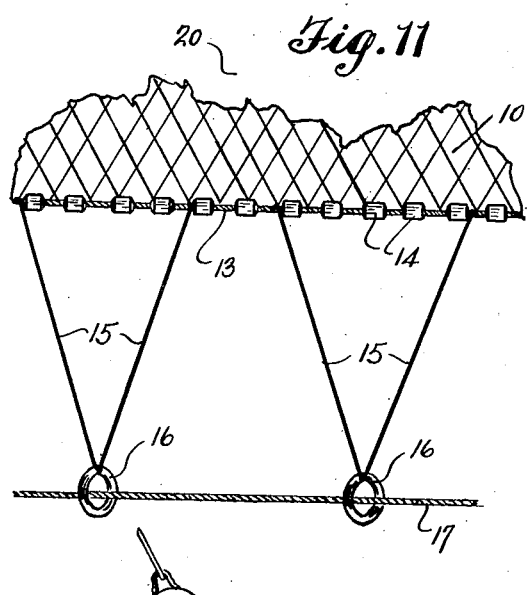
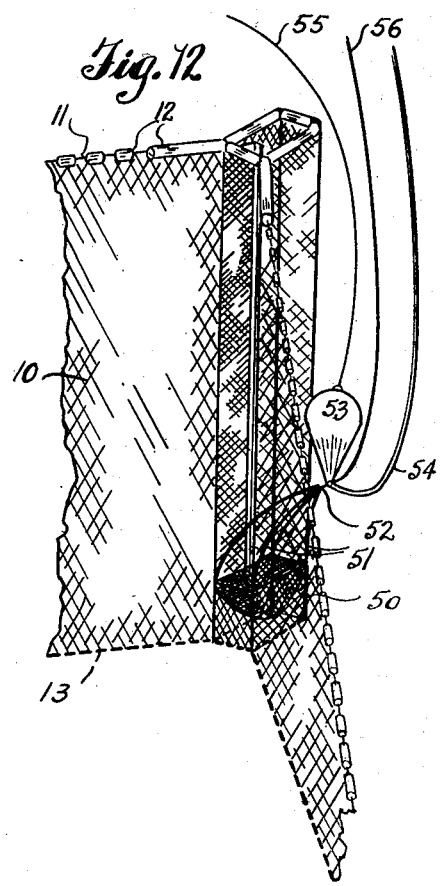

Patented Mar. 30, 1954

2,673,415

UNITED STATES PATENT OFFICE 2,673,415

PURSE SEINE AND ITS METHOD OF USE

Hilding E. Strom, Seattle, Wash.

Application April 24, 1950, Serial No. 157,758

10 Claims. (Cl. 43—4.5)

This invention relates to fishing operations that are carried on in the ocean by use of purse seines. More particularly, the invention relates to improvements in the construction of purse seines and in their methods of use, especially in the provision of novel means for dividing a purse seine and a catch of fish as enclosed therein, and means for lifting the divisional parts to facilitate the raising of the catch to position for brailing or otherwise transferring it from the seine to the attending boat or craft hereinafter referred to as the "tender."

Fishing on the high seas for certain kinds of fish, for example, tuna fish, is carried on by use of purse seines. These seines comprise long strips of netting that when properly placed in the water will depend below the surface to from forty to sixty fathoms. They are from four hundred to six hundred fathoms long and provide that an area of up to two hundred fathoms in diameter may be encircled. Such seines are carried to the fishing waters on tenders, and when a school of fish is sighted, the seine is payed out from the stern of the tender as it is caused to encircle the school, thus causing the net to form an enclosure thereabout. The seine netting is woven of suitable cords, and in the water is supported by floats applied to a "float line" comprised in its upper edge. It likewise is properly held down in the water by weights or sinkers attached to a "lead line" comprised in and extended along its lower edge. After a school of fish has been encircled by the net, the ends of the netting strip are joined and the seine secured to the tender. Then the bottom edge of the netting strip is pursed together, thus to close the lower end of the seine; this being accomplished by drawing in a pursing cable that is threaded through rings or loops attached to the netting along its lower edge. The pursed lower edge portion of the seine, including lead line and rings, are then hauled in over the tender's gunwhale and laid on the deck as illustrated in Fig. 1. Then by "strapping in" the seine and piling it on the seine table, the purse is gradually reduced and the catch of fish is thus finally caused to be concentrated in a relatively small pocket. If the caught fish are alive, they may be brailed from the pocket after it has been reduced to a certain size. In the case of the catch of fish being dead, such as would be the case of tuna fish, it is generally necessary to divide the pocket and lift the divisional parts to or near the surface for brailing. This dividing is done by lifting the netting along a selected line across the enclosure by means of a boom.

A disadvantage in use of such purse seines and methods of use, especially for tuna fishing, resides in the fact that if a large catch is enclosed, it is impossible to land it quick enough to avoid water cooking and loss due to shark damage to netting. Furthermore, since tuna fish die almost immediately upon being caught, the dead weight of the load cannot be lifted by means of the net itself because of its lack of strength. This has lead to a practice when large schools are located of pursing only a part of the school. The remaining part of the school will thus be lost.

In view of the foregoing explanatory matter and for various other reasons, it has been an object of this invention to provide a purse seine that is equipped with novel, practical and economical means for dividing it into a plurality of individual pockets or bags, after a catch has been enclosed therein, thus to divide the catch of fish into amounts that can be lifted and removed quickly and without damage to the net.

More specifically stated, the objects of the present invention are to be found in the provision of novel gear and inflatable floats whereby a pursed seine, with catch enclosed therein, may be divided into a plurality of individual pockets or bags, thus to divide a heavy catch of fish into amounts that can be lifted and handled. Furthermore, to provide novel gear and inflatable floats whereby the individual pockets may be lifted to the surface for brailing or otherwise transferring the fish therefrom into the tender.

It is a further object of the invention to provide seine dividing and lifting means comprising inflatable balloon-like floats, and gear whereby they may be drawn below the surface, there secured to the seine for lifting it, and then inflated for the lifting operation.

Further objects of the invention reside in the details of construction and in the combination of parts of the seine and in the mode of use of the seine as will hereinafter be described.

In accomplishing these and other objects of the invention, I have provided the improved details of construction, the preferred forms of which are illustrated in the accompanying drawings, wherein—

Fig. 2 is a side view of the tender and pursed seine, showing the latter after being divided into a plurality of pockets or bags, to divide the catch accordingly.

Fig. 3 is an end view of the tender and pursed seine, illustrating the disposition of one of the balloon floats as used in dividing the purse.

Fig. 4 is a view illustrating the closing off of the lower end portion of one of the bags or pockets constituting a division of the purse.

Fig. 5 is a view illustrating the raising of the catch in one of the pockets by use of an inflated balloon.

Fig. 6 is a side view of a length of the purse seine netting showing application of one of the pilot lines used therewith.

Figure 1:
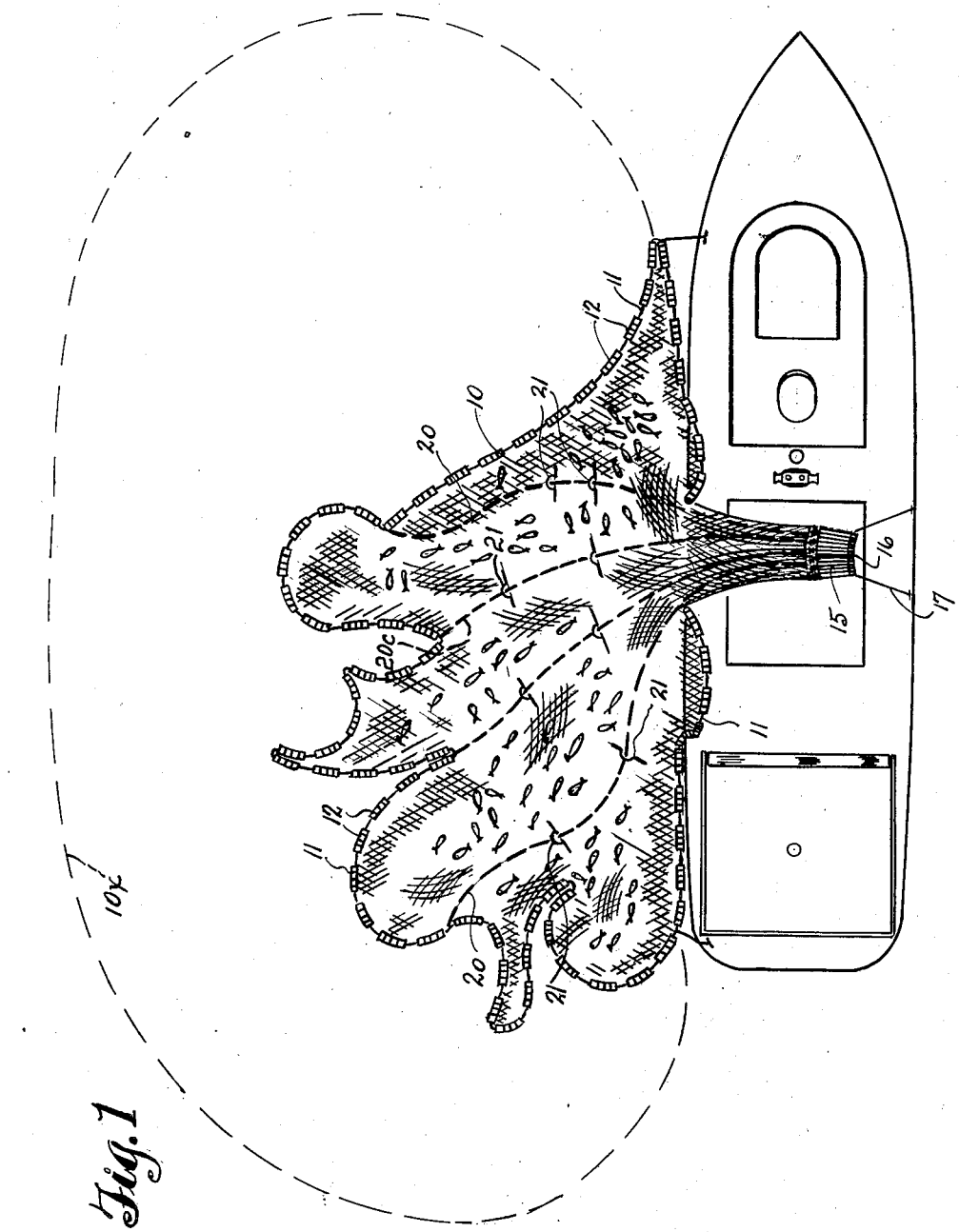
Fig. 1 is a plan view of a tender, and seine, with the pursed end of the seine laid on the deck of the tender, preparatory to dividing the seine, and showing in dotted lines, an approximate position of the purse seine as initially payed out to encircle a school of fish.

Figs. 7 and 8, respectively, are views illustrating successive steps in the drawing of a balloon float to position for effecting a division of the purse seine.

Fig. 9 illustrates, as an alternative means, the use of a balloon float that is fastened permanently to the net and equipped with an air tube for its inflation.

Fig. 10 is a side view of a length of the seine, netting, showing the method of disposing and securing the pocket choker lines thereto and the application of the pilot lines.

Fig. 11 is an enlarged detail of a lower edge portion of the strip of netting, showing the application of the pursing line or cable to the rings of bridles attached to the lead line.

Fig. 12 is a perspective view showing the use of a balloon float for lifting the spiller or pot of a fish trap.

Fig. 13 is a detail showing the anchor knob for a lifting balloon the air supply hose therefor being omitted.

Referring more in detail to the drawings—

The present invention pertains particularly to fishing as carried out by use of a purse seine. A short longitudinal section of netting from a purse seine has been illustrated in Fig. 10 and it is to be further explained that the seine comprises an elongated strip of such netting, herein designated by numeral 10, equipped along its top edge with a float line 11 to which a succession of suitable floats 12 are applied to properly support the seine in the water, and is equipped along its lower edge with a lead line 13 to which sinkers or weights 14 are applied to hold the net down in the water to the full extent of the width of the strip. Also, secured to the lead line 13 along the full extent of the lower edge of the strip of netting, is a succession of bridles 15, shown best in Figs. 10 and 11, equipped with rings 16 through which a pursing cable 17 is threaded, for pursing the seine. The ends of this cable are extended to a winch on the deck of the tender. When payed out from the tender, the strip of netting will sink to a vertically suspended position, as in Fig. 10, and be supported in the water by the floats 12. It is the general practice in fishing, to encircle a school of fish as the seine is payed out from the tender, in such manner as to cause the school to be enclosed by the netting strip. In Fig. 1, I have indicated, in dotted lines at 10x an approximate position of the strip of netting as payed out to encircle a school of fish.

Assuming that a school of fish has been encircled by the netting, and the opposite ends of the elongated strip 10 have been joined together at the side of the tender as is usually done, the next step in the usual operation to purse the seine, that is, to close the lower end of the enclosure. This pursing operation is accomplished by drawing in on the opposite ends of the pursing cable 17, which can be most readily accomplished by winding in the ends of the cable on winch drums on the tender. After the lower edge of the strip of netting has been pursed, the pursed lower end of the net is drawn up over the gunwhale of the tender and laid on the deck as shown in Fig. 1. The float line is then drawn in and in this way the enclosure formed by the pursed seine is gradually reduced in size ot that desired. The single pocket is then lifted in the water until the catch can be brailed therefrom.

In the operation anticipated by my invention, the enclosure as provided by the seine is so divided into a plurality of separate pockets or bags after it has been brought to the position or condition as shown in Fig. 1 that the catch of fish therein is divided accordingly. The dividing of the pursed seine into the succession of pockets, as shown in Fig. 2, is accomplished by means and in the manner now to be described.

It is shown best in Fig. 10 that the strip of netting 10 which forms the purse is equipped at spaced intervals therealong with vertical crosslines or cables 20 extended from float line to lead line, which I will hereinafter refer to as pilot lines. These lines are shown in Fig. 1 as leading from the float line, at the outside of the seine into the pursed end of the seine where they are attached to the lead line. These pilot lines are detachably secured by being tied at their opposite ends to the float line 11 and lead line 13. Also, they are located at the outside of the net and pass freely through guide loops 21 secured to horizontal lines 22 that are sewed to the netting, and which are shown in Figs. 6, 7 and 8. These pilot lines are located at the selected separation areas for the pockets or bags as shown in Fig. 10. It will be understood that when the seine is pursed, and the lead line and bridles 15 are laid on the deck of the tender, as in Fig. 1, the lower ends of all these pilot lines 20 will be accessible to workmen on the tender.

The actual dividing of the pursed seine into a plurality of pockets is accomplished as follows:

Starting with the seine in pursed condition and the pursed end laid on the deck of the tender as in Fig. 1, and the float line close to the side of the tender, the outer end of the central pilot line, for example line 20c in Figs. 1 and 10; is then detached from the float line 11. Then a work line 25 is drawn out from the tender and its outer end is attached to the released outer end of the pilot line. The inner end of the pilot line 20c is then detached from the lead line and the pilot line drawn in. This causes the work line 25 to be drawn out over the outer boundary of the net in the direction of the arrow in Fig. 3, and downwardly therealong and beneath it, through the guide loop 21 and then up to the deck of the tender. A deflated balloon-type float 26 of proper size and structure is attached to the trailing end of the work line and is pulled thereby over the outer edge of the seine, down into the water to the position indicated in Fig. 3, with the lower end of the balloon adjacent the loop 21 through which line 25 passes. A second work line, 25x, is attached to the upper end of the balloon and is drawn thereby over the outer edge of the net, to be used in conjunction with line 25 for lifting the net. The lower end of the balloon it attached to the larger end of a conical knob 28, to the apex of which knob the work line is attached. This knob will finally be pulled apex first through the loop 21 and since it will not pull through the loop in a reverse direction, it will serve as an anchor whereby the balloon float is secured to the net for lifting the latter. After the anchor knob has been drawn through the loop, the balloon is inflated to such extent that the net will be lifted. To aid in the lifting operation as effected by the balloon, the work line to which it is attached, is wound in also. The result is that the net is lifted and the purse divided into two compartments. Then the other pilot lines are selectively utilized to further draw other balloons to lifting position to further divide the purse into a plurality of pockets as has been illustrated in Fig. 2. It is desirable after the seine has been centrally divided by the first dividing operation as effected by cable 20c, to centrally divide each of the two resulting pockets, and then if necessary to centrally divided the four pockets that result from the second dividing operation. Inflation of each balloon is effected by the forcing of air or gas thereto through a hose 30 that leads from the tender's deck to the balloon.

The catch of fish enclosed in the seine will be divided in accordance with the number of divisions of the seine, and therefore instead of the entire catch having to be lifted by the net, the divisional parts can be lifted one at a time by lifting the individual bags or pockets to bring the catch therein to the surface.

For the raising of the catch in the individual pockets, it is desirable that the lower ends of the pockets in which the catch settles first be closed off as shown at the right side of Fig. 4. For this purpose, I provide means that now will be described. In Fig. 10 it is noted that a plurality of loops 35 are applied to the outside of the net in circular arrangement, with the center of the circle of loops located at the center of the section of netting set off between adjacent pilot lines 20 drawn transversely across the net. A pilot line 36 is drawn through these circularly arranged loops, and its ends are extended to the float line and are temporarily tied thereto.

When the seine is divided into pockets, as shown in Fig. 2, it will be apparent that the bottom portions of the pockets will be comprised by those areas of the net that are encircled by the pilot lines 36 as applied to loops 35. These lines are somewhat above the lower ends of the pockets. To lift the catch as enclosed in a pocket to the surface, the procedure is to release the pilot line 36 from the float line and to tie a heavy work line 37 to one end thereof, then by means of the line 36 to pull the work line down and through the series of loops 35. A deflated balloon 38 is attached to the trailing end of the work line and will be pulled thereby to the first entered loop where it will be checked. Continued up-pull on the work line then causes the lower end of the bag to be gathered together or choked off as seen in Fig. 4. Then, by inflating the balloon and at the same time hauling in on the work line, the catch of fish as enclosed in the pocket can be readily lifted to the surface. The net can then be adequately secured to the tender and the bag opened for removal of the catch. The object of closing off the bag by the work line is to cause the strands of the net to be gripped tightly together in a manner that lifting strain will be applied equally to all strands of the netting and thus eliminate the chance of tearing the net and loosing the catch, as frequently happens when ordinary lifting methods are followed.

The handling of the net on the tender is carried on in the usual manner and forms no part of the present invention.

The main features of the present invention reside in the means for and manner of dividing the pursed seine into a plurality of pockets, thus to divide the catch of fish accordingly and in the manner of and means for lifting of the individual pockets; both the dividing operation and the lifting being facilited by use of balloons that can be drawn below the surface in deflated condition, and then inflated to effect the lifting of those parts to which they are secured.

The drawing of the balloons to position, and their practical use, is dependent upon the use of the pilot lines and work lines as has been explained.

The manner of securing the balloons for the lifting of the net might be accomplished in various ways, but the means described is believed to be most practical.

By the use of the present gear, it is possible to handle exceedingly large catches of fish, without necessitating loss of any part thereof. The raising of the seine with catch can be accomplished in a relatively short time and thus the chance of loss due to water cooking, and shark action is reduced to a minimum.

The same idea as used for lifting the pockets can be applied to lifting the spiller or pot of a fish trap and this has been illustrated in Fig. 12 wherein the trap pot is designated at 50, and it is shown to have lifting lines 51 leading to a point of connection 52 with a balloon 53, the balloon having an inflating hose 54 extended to the surface and lifting lines 55 and 56.

The provision of means for the dividing of the purse seine, to thus divide the catch accordingly, is advantageous to lifting heavy catches, especially when the caught fish are dead. It is advantageous and desirable also because it becomes unnecessary to divide the seine for the release or discharge of a part of a catch that cannot be lifted by ordinary means.

The manner of securing the loops for guiding of pilot lines might be accomplished in various ways. However, it is desired that the loops that sustain weight, be secured to heavy lines that are stitched in or so woven into the netting that the pull is evenly distributed over an extended area and no single strand will be subjected to abnormal or detrimental pull.

It is further to be explained that the balloons 26x might in some instances be advantageously permanently attached to the netting by means of vertical lines 200 incorporated in the netting as has been shown in Fig. 9, and it is not desired to confine the invention to the use of balloons that are pulled to position by the pilot lines or lifting cables.

It is readily apparent that changes in details of construction might be made without departing from the spirit of the invention.

Having thus described my invention, what I claim as new therein and desire to secure by Letters Patent, is—

1. The method of purse seine fishing from a fishing vessel comprising paying out a strip of seine netting from the vessel to cause it to encircle and enclose an area, pursing the lower end of the seine and drawing that end onto the vessel, passing lifting cables about the pursed seine along selected divisional lines and then drawing in the cables thus to gather the seine into a plurality of pockets, choking off the lower end portions of the pockets to enclose the catch therein and then individually lifting the choked off portions of the pockets to the surface for removal of catch therefrom.

2. The method of purse seine fishing from a fishing vessel comprising paying out a strip of seine netting from the vessel to cause it to encircle and enclose an area, pursing the lower end of the seine and drawing that end onto the vessel, passing lifting cables about the pursed seine along selected divisional lines and then drawing in the cables thus to gather the seine into a plurality of pockets, passing choker cables about the lower end portions of the pockets, drawing in these cables to choke off the catch-containing lower end portions thereof, and then utilizing the choker lines for lifting the pockets and catch therein to the surface.

3. The method of purse seine fishing from a fishing vessel comprising paying out a strip of seine netting from the vessel to encircle and enclose an area, pursing the lower end of the seine, and drawing that end onto the vessel, passing cables about the pursed seine along selected divisional lines and drawing deflated balloons to the lower end of the pursed seine by means of said cables, then inflating the balloons and drawing in on the cables thus to gather the seine along the divisional lines into a plurality of separate pockets, passing choker cables about the lower end portions of each of the pockets, drawing the inflated balloons to the lower ends of the pockets by said choker cables, and effecting the closing off of the lower end portions of the pockets to confine the fish catch therein, and then inflating the said balloons and drawing in the choker cables to lift the pockets and catch of fish therein to the surface for removal to the vessel.

4. A purse seine comprising an elongated strip of netting adapted to be formed into a purse, and equipped along its top edge with float line and floats and along its lower edge with sinkers and a pursing cable, cable guide loops attached to the netting at spaced intervals therealong in an area between the top and bottom edges of the netting, pilot lines extended vertically across the netting strip at the outside of the same, each being threaded through one of the said loops and detachably secured at its ends to the net at top and lower edges thereof, and lifting cables corresponding to the pilot lines and each adapted to have an end thereof attached to an end of the corresponding pilot line after the latter has been released, and thereby to be adapted to be drawn by the released pilot line about the pursed seine and through the guide loop, and to serve when so applied as a means whereby the seine may be gathered and lifted along the area of application of said cable, thus to cause the seine to be formed into individual pockets between the said lifting cables.

5. A purse seine as in claim 4 including also balloons that are attached to said lifting cables, and are adapted to be drawn thereby beneath the lower portion of the pursed seine, and means for inflating the balloons as an aid in raising and gathering the seine to form the pockets.

6. A purse seine as in claim 4 including also balloons that are attached to said lifting cables, and are adapted to be drawn thereby beneath the lower portion of the pursed seine, means for inflating the balloons as an aid in raising and gathering the seine to form the pockets, and anchor means at the points of attachment of the balloons with their respective cables, adapted to be drawn through the guide loop through which the cable passes for automatic securement therein to effect a lifting connection between balloons and netting.

7. A purse seine comprising an elongated strip of netting, equipped with floats along its top edge and with sinkers and pursing cable along its lower edge, and adapted to be disposed in the water to form an enclosure, and to be pursed by said pursing cable; lifting cables applied about the purse at selected lines of division, whereby the netting can be gathered and lifted in a manner to form those parts of the purse between the cables into individual, depending pockets, and choker cables applied to the netting at places to encircle the areas thereof that are to define the bottoms of said pockets, and whereby the said pockets may be gathered and closed to confine a catch of fish within the lower end portion.

8. A purse seine comprising an elongated strip of netting, equipped with floats along its top edge and with sinkers and pursing cable along its lower edge, and adapted to be disposed in the water to form an enclosure, and to be pursed by said pursing cable; lifting cables applied about the purse at selected areas of division, whereby the netting can be gathered and lifted in a manner to form those parts of the purse between the cables into individual, depending pockets, guide loops affixed to the netting in circular arrangement about each of those areas thereof that is to define the lower end portion of a pocket, and lifting cables threaded through said loops and extended from the seine as a means for choking off the lower end portions of the pockets and for lifting them to the surface.

9. A purse seine comprising an elongated strip of netting, equipped with floats along its top edge and with sinkers and pursing cable along its lower edge, and adapted to be disposed in the water to form an enclosure, and to be pursed by said pursing cable; lifting cables applied about the purse at selected lines of division, whereby the netting can be gathered and lifted in a manner to form those parts of the purse between the cables into individual, depending pockets, guide loops affixed to the netting in circular arrangement about each of those areas thereof that is to define the lower end portion of a pocket, pilot lines threaded through said guide loops with free ends extended to the top edge of the net, additional lifting cables each adapted to be attached to the end of a pilot line to adapt it, to be drawn thereby through the circularly arranged loops as a means for choking off the lower end portion of the enclosed pocket and for lifting them to the surface, and deflated balloons attached to the said lifting cables and adapted to be drawn thereby below the surface, to the lower end portions of the pockets for securement thereto, and means for inflating said balloons when in this position.

10. A purse seine comprising an elongated strip of netting equipped along its top edge with a float line, and along its lower edge with a lead line and pursing cable, guide loops fixed to the netting at spaced intervals therealong in a longitudinal area between top and bottom edges, pilot lines extended across the netting at the outside thereof and between the float and lead lines, each being threaded through one of the guide loops and releaseably secured at its ends to said float and lead lines, and net gathering and lifting cables, corresponding to the pilot lines; each adapted to have one end thereof attached to an end of the corresponding pilot line when the latter is released at its ends and thereby to be adapted to be drawn by the released pilot line about the pursed seine.

HILDING E. STROM.

References Cited in the file of this patent

UNITED STATES PATENTS

| Number | Name | Date |
|---|---|---|
| 20,125 | Hall | Apr. 27, 1858 |
| 197,313 | Bates | Nov. 20, 1877 |
| 251,018 | Austin | Dec. 20, 1881 |
| 1,239,260 | Curtiss | Sept. 4, 1917 |
| 1,287,908 | Delany | Dec. 17, 1918 |
| 1,336,356 | Johnson | Apr. 6, 1920 |
| 1,548,942 | Goulding | Aug. 11, 1925 |
| 2,508,800 | Rinne | May 23, 1950 |

FOREIGN PATENTS

| Number | Country | Date |
|---|---|---|
| 648 | Great Britain | 1898 |
| 43,239 | Norway | Oct. 18, 1926 |
| 568,221 | France | Mar. 18, 1924 |